United States Patent
Greif et al.

(10) Patent No.: US 10,395,281 B2
(45) Date of Patent: Aug. 27, 2019

(54) ADVERTISEMENT SELECTION AND PRICING BASED ON ADVERTISEMENT TYPE AND PLACEMENT

(71) Applicant: Facebook, Inc., Menlo Park, CA (US)

(72) Inventors: Yaron Greif, San Francisco, CA (US); Zhengyu Yin, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 161 days.

(21) Appl. No.: 13/970,030

(22) Filed: Aug. 19, 2013

(65) Prior Publication Data
US 2015/0051987 A1 Feb. 19, 2015

(51) Int. Cl.
G06Q 30/00 (2012.01)
G06Q 30/02 (2012.01)

(52) U.S. Cl.
CPC .............. *G06Q 30/0276* (2013.01)

(58) Field of Classification Search
CPC ................................. G06Q 30/0276
USPC ....................................... 705/14.69
See application file for complete search history.

(56) References Cited

U.S. PATENT DOCUMENTS

| | | | | |
|---|---|---|---|---|
| 7,809,611 B2 * | 10/2010 | Banbury | ............... | G06Q 30/02 705/14.71 |
| 7,983,959 B2 * | 7/2011 | Chickering | ............ | G06Q 30/02 705/14.4 |
| 2007/0038514 A1 | 2/2007 | Patterson et al. | | |
| 2008/0004990 A1 * | 1/2008 | Flake | .................... | G06Q 30/02 705/26.1 |
| 2008/0126192 A1 | 5/2008 | Patel et al. | | |
| 2008/0256039 A1 * | 10/2008 | Chang | .................... | G06Q 30/02 |
| 2009/0248513 A1 * | 10/2009 | Aggarwal | ............. | G06Q 30/02 705/14.72 |
| 2010/0198694 A1 * | 8/2010 | Muthukrishnan | .. | G06Q 30/0275 705/14.71 |
| 2010/0257054 A1 * | 10/2010 | Martin | .................. | G06Q 30/02 705/14.46 |

(Continued)

OTHER PUBLICATIONS

Microsoft Computer Dictionary, Fifth Edition, 2002, Microsoft Press, p. 23.*

(Continued)

*Primary Examiner* — Matthew T Sittner
*Assistant Examiner* — Michael I Ezewoko
(74) *Attorney, Agent, or Firm* — Fenwick & West LLP (57) ABSTRACT

An online system selects advertisements for presentation in various advertisement slots to maximize the total value to the online system for advertisement presentation. Candidate advertisements for presentation to a user are identified and types of advertisements are associated with various advertisement slots. For example, types of advertisements are associated with advertisement slots based on values for presenting various types of advertisements in different advertisement slots and one or more ad placement rules. Candidate advertisements having an advertisement type associated with each advertisement slot are identified, and an expected value of various placements of the candidate advertisements having a type corresponding to advertisement slots is determined. Based on the expected values, a placement of candidate advertisements in advertisement slots is selected and presented to a user.

20 Claims, 2 Drawing Sheets

(56) References Cited

U.S. PATENT DOCUMENTS

2011/0153377 A1 6/2011 Novikov et al.
2012/0016741 A1* 1/2012 Brunsman .......... G06Q 30/0251
                                                         705/14.49

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Algorithms + Data Structures = Programs, 1976, pp. xii-55.*
HCI remixed : reflections on works that have influenced the HCI community, MIT Press, 2008: pp. 275-279.*
hy A Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*
PCT International Search Report and Written Opinion, PCT Application No. PCT/US2014/049702, dated Nov. 18, 2014, fourteen pages.
Canadian Intellectual Property Office, Office Action, Canadian Patent Application No. 2,917,537, dated Oct. 11, 2016, five pages.
Canadian Intellectual Property Office, Office Action, Canadian Patent Application No. 2,917,537, dated Oct. 30, 2017, six pages.

* cited by examiner

ADVERTISEMENT SELECTION AND PRICING BASED ON ADVERTISEMENT TYPE AND PLACEMENT

BACKGROUND

This disclosure relates generally to online systems, and in particular to placement of advertisements for presentation to online system users.

Online systems, such as social networking systems, allow users to connect to and communicate with other users of the online system. Users may create profiles on an online system that are tied to their identities and include information about the users, such as interests and demographic information. Presenting advertisements to users of an online system allows an advertiser to gain public attention for products or services and to persuade online system users to take an action regarding the advertiser's products, services, opinions, or causes.

A conventional online system may select and provide multiple advertisements to a user. For example, an online system includes multiple advertisement slots in content presented to a user and presents various advertisements using the advertisement slots. The online system may determine which advertisement slot is used to present an advertisement based on bid amounts associated with advertisements. However, conventional methods for matching advertisements with advertisement slots do not account for different sizes of advertisements or different content of advertisements. For example, in a vertical arrangement of advertisements, placing an advertisement with a small vertical dimension in the highest advertisement slot has less effect on interactions with advertisements presented in other, lower, advertisement slot than placing an advertisement with a larger vertical dimension in the highest advertisement slot. Hence, conventional methods for placing an advertisement in an advertisement slot do not consider effects of advertisement placement on advertisements presented in additional advertisement slots.

SUMMARY

An online system, such as social networking system, presents advertisements to its users, allowing advertisers to provide information about products or services to users of the online system. In some embodiments, the online system receives advertisement requests ("ad requests") from advertisers or other entities. Each ad request includes an advertisement and a bid amount associated with the advertisement. Targeting criteria may be included in an ad request identifying one or more characteristics of a user eligible to be presented with the advertisement included in the ad request. Additionally, advertisements described by ad requests may have varying sizes or content types. For example, advertisements may have variable dimensions, such as height and width, and variable types of content, such as text, video, audio, etc.

In some embodiments, the online system presents multiple advertisements to a viewing user in an arrangement of advertisement slots that are included in content presented by the online system. Different advertisement slots correspond to different locations in an arrangement of content displayed to the viewing user. To select placement of advertisements in advertisement slots for presentation to the viewing user, the online system identifies candidate advertisements that are eligible for presentation to the viewing user. Candidate advertisements are advertisements that satisfy one or more targeting criteria identifying one or more characteristics of the viewing user.

In some embodiments, to more efficiently select an optimal placement of advertisements in advertisement slots, the online system identifies a type of advertisement associated with each of the candidate advertisements. Information describing a type of advertisement associated with a candidate advertisement is included in an ad request, along with an advertisement and a bid amount. The type of advertisement may be based on the source of the advertisement (e.g., the online system itself, a third-party system), a size of a dimension of the advertisement, a type of content included in the advertisement, a priority associated with presentation of the advertisement, or any other suitable information. In various embodiments, a type and one or more sub-types may be associated with an advertisement.

In some embodiments, based on the types of advertisements eligible for presentation to a user, the online system associates a type of advertisement with each advertisement slot. In some embodiments, one or more rules specifying the placement of types of advertisements relative to other types of advertisements are retrieved and used to associate a type of advertisement with each of the advertisement slots. For example, a rule may indicate that an advertisement received from an advertiser occupies an advertisement slot having a higher position in a page layout than an object, such as a recommendation unit, that suggests an action for a viewing user to perform. As another example, a rule may specify that only a single advertisement of a particular type is included in a page layout, or that advertisements of a specified type are not included in adjacent advertisement slots. Additionally, one or more rules specifying the placement of types of advertisements relative to other types of advertisements may be based on the expected value to the online system for presenting a candidate advertisement. The expected value may be based on a bid amount associated with a candidate advertisement, an expected click-through-rate associated with the candidate advertisement, or any other suitable value. For example, a rule associates an advertisement slot with an advertisement type associated with a candidate advertisement having a maximum value.

In some embodiments, discount factors for presenting various advertisements in various advertisement slots are also determined by the online system. A discount factor reduces the bid amount of an advertisement presented in an advertisement slot and is used to determine a placement of advertisements in particular advertisement slots. In some embodiments, the type of advertisement associated with an advertisement slot affects the discount factor and the types of advertisements associated with additional slots. Additionally, a discount factor may take into account characteristics of an advertisement itself, such as the size of the advertisement or the content of the advertisement, as well as characteristics of advertisements placed in other advertisement slots.

In some embodiments, when a type of advertisement is associated with each advertisement slot, the online system selects a candidate advertisement for inclusion in each slot based on the type and bid amounts associated with the candidate advertisements. In some embodiments, the online system selects an advertisement slot associated with a type of advertisement and retrieves candidate advertisements of the same type. Based on the bid amount and a discount factor associated with presenting an advertisement in an advertisement slot, the online system determines the value of presenting the advertisement in the advertisement slot. Values for presenting various advertisements of a type associated with an advertisement slot are determined and used to select advertisements for presentation in one or more of the advertisement slots. For example, the online system selects advertisements for presentation in an advertisement slot to maximize a combined value of each advertisement slot. This placement of advertisements in advertisement slots results in the maximum total value for the particular arrangement of advertisements. Advertisements are then presented to the viewing user based on the placement of advertisements in the advertisement slots.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
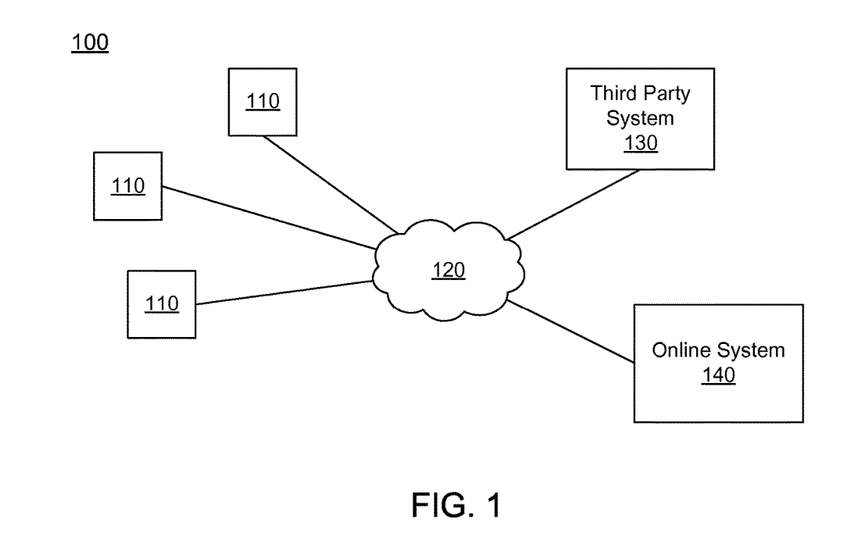
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
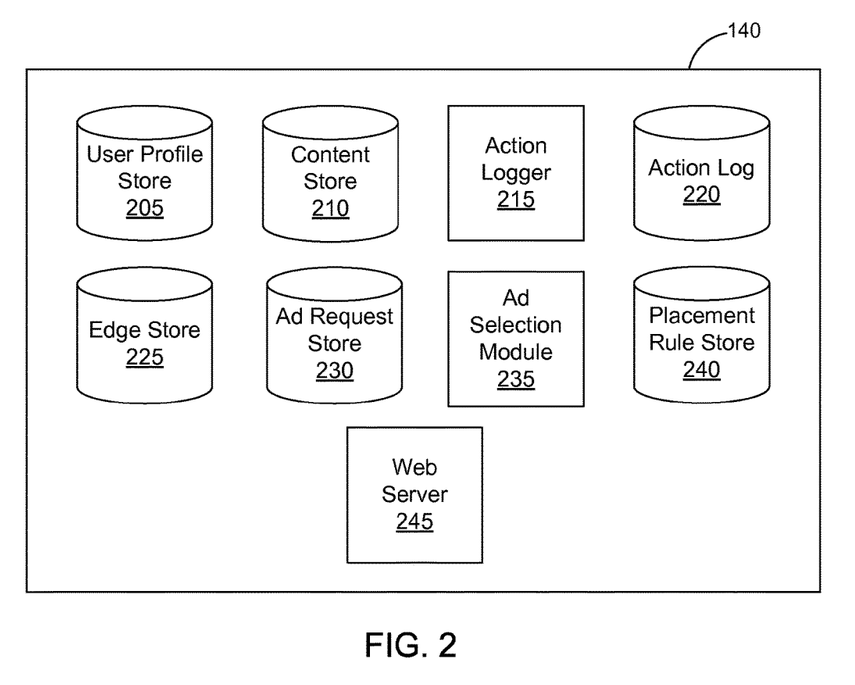
FIG. 2 is a block diagram of an online system, in accordance with an embodiment.

FIG. 2 is a block diagram of an architecture of the online system 140, which may be a social networking system in some embodiments. The online system 140 shown in FIG. 2 includes a user profile store 205, a content store 210, an action logger 215, an action log 220, an edge store 225, an ad request store 230, an ad selection module 235, a placement rule store 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content includes text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed by a user.

Additionally, an advertisement request may include one or more targeting criteria specified by the advertiser. Targeting criteria included in an advertisement request specify one or more characteristics of users eligible to be presented with advertisement content in the ad request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The ad selection module 235 receives information identifying a number of advertisement slots each used to present an advertisement to an online system user and selects advertisements for presentation in the slots. For example, the ad selection module 235 receives or maintains information describing a number of advertisement slots and the positioning of advertisement slots relative to each other. Additionally, in some embodiments, the ad selection module 235 may receive information describing dimensions for one or more advertisement slots. The ad selection module 235 selects advertisements from the ad request store 230 for presentation in one or more of the advertisement slots.

The ad selection module 235 also generates discount factors for presenting advertisements in various advertisement slots, and uses the discount factors when selecting advertisements for presentation in various advertisement slots. Discount factors may be based on prior user interactions with previously presented advertisements. For example, an expected click-through-rate for an advertisement presented in an advertisement slot is determined based on the position of the advertisement slot, the type of the advertisement, the size of the advertisement, as well as the types of advertisements in other advertisement slots.

A discount factor may be based on the position of an advertisement slot relative to other advertisement slots. In one embodiment, discount factors for presenting advertisements in various advertisement slots are inversely proportional to an amount of user interaction with advertisements presented in the advertisement slots based on prior user interactions with advertisements previously presented in various advertisement slots. As an additional example, in a vertical arrangement of advertisements, expected user interaction decreases from the highest to lowest advertisement slot, so the advertisement slot with the highest expected user interaction may receive no discount while subsequent, lower, advertisements receive discounts based on an expected amount of user interaction.

The size or content of an advertisement presented in an advertisement slot may also affect the discount factor for presenting the advertisement in the advertisement slot. In one embodiment, if advertisements have a variable dimension, the size of the variable dimension may modify the discount factor for presenting advertisements in advertisement slots. For example, if advertisements are presented vertically, a smaller discount factor may be applied when presenting an advertisement in an advertisement slot if an advertisement has a relatively smaller vertical size than if the advertisement has a relatively larger vertical size, as relatively smaller advertisements allow additional advertisements to be presented in more visible locations. Similarly, if advertisements are presented vertically, a larger discount factor may be applied to advertisements presented in advertisement slots below an advertisement slot presenting an advertisement with a relatively larger vertical size because the available space for presenting advertisements is reduced by presenting the advertisement with the relatively larger vertical size. Additionally, the type of content in an advertisement may affect the discount factor for presenting the advertisement in an advertisement slot. For example, advertisements including image, video, or audio content are more likely to distract a user from additional advertisements limited to text data; hence, a discount factor for presenting an advertisement in an advertisement slot may be larger for an advertisement including text data than for an advertisement including audio or video content.

Types associated with advertisements presented in additional advertisement slots also influence the discount factor for presenting an advertisement in an advertisement slot. In one embodiment, additional advertisements having the same type as an advertisement that are presented in additional advertisement slots are used to determine the discount factor for presenting an advertisement in an advertisement slot. The discount factor for presenting an advertisement in an advertisement slot may be proportional to the number of advertisements having the same type as the advertisement that are to be presented in additional advertisement slots, as users are less likely to be interested in multiple advertisements of the same type. For example, the first advertisement of a particular type presented in an advertisement slot does not receive a discount while subsequent advertisements of the same type presented in additional advertisement slots receive discounts based on the number of advertisements of the same type presented in additional advertisement slots.

Based on the discount factors and bid amounts associated with presentation of advertisements in advertisement slots, the ad selection module 235 selects advertisements for placement in advertisement slots and presentation to users. In one embodiment, the ad selection module 235 determines a type associated with each advertisement slot and applies one or more rules retrieved from the placement rule store 240 when determining a type associated with various advertisement slots. For each advertisement slot, the ad selection module 235 determines values for presenting various advertisements having the corresponding type based on bid amounts associated with the advertisements and discount factors for presenting the advertisements in an advertisement slot. A value for a cost-per-impression advertisement may be based on the bid amount associated with the advertisement, while the value of a cost-per-click advertisement may be based on its associated bid and an expected click-through-rate for the advertisement. As further described below in conjunction with FIG. 3, the ad selection module 235 may select advertisements to maximize a total value of the advertisements presented in each advertisement slot. In some embodiments, the ad selection module 235 determines multiple placements of advertisements in advertisement slots and selects a placement of advertisements in advertisement slots that maximizes the sum of the values of advertisements presented in the advertisement slots.

For example, to associate an advertisement having a maximum value with each advertisement slot, the ad selection module 235 performs a recursive process that attempts to fill each advertisement slot with each advertisement type. In one embodiment, the ad selection module 235 performs a time-efficient process that determines an upper bound of the value, guaranteed to be at least as great as the maximum achievable value of presenting advertisements in the advertisement slots by rapidly finding a maximum value associated with various advertisement slots. For example, the ad selection module creates a bipartite graph matching problem to using the maximum possible position discount among advertisements capable of being used in an advertisement slot and relaxing rules about the order in which ads can be displayed. It then performs a bipartite graph matching algorithm (e.g., Hungarian algorithm, successive shortest path algorithm) to determine the upper bound discount for presenting advertisements. If this upper bound is greater than an already found value than the algorithm terminates, otherwise it recursively continues until each advertisement slot is associated with a particular type of advertisement. Based on the advertisement type determined for various advertisement slots, the ad selection module 235 populates advertisement slots with advertisements of the determined advertisement type to get a possible maximum attainable value.

The placement rule store 240 includes one or more advertisement placement rules specifying placement of advertisements in advertisement slots. Advertisement placement rules may specify limitations on presentation of advertisements in one or more advertisement slots. For example, an advertisement placement rule specifies a maximum number of advertisements of a specific type to be presented. As another example, an advertisement placement rules limits a number of advertisements of a specific type that are presented in adjacent advertisement slots. An advertisement placement rule may specify presentation of an advertisement type associated with an advertisement having a maximum value in an advertisement slot. Additionally, one or more advertisement placement rules may specify a hierarchy of types of advertisements, where association of an advertisement type with an advertisement slot is based in part on association of advertisement types with other advertisement slots. For example, after associating small advertisements from a third party system 130 with adjacent advertisement slots, an additional advertisement slot is associated with a medium or large advertisement from a third party system 130 because these types of advertisements have a lower position in a hierarchy of types of advertisement than small advertisements from a third party system 130.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or RIM®.

Determining Placement of Advertisements for Presentation

Figure 3:
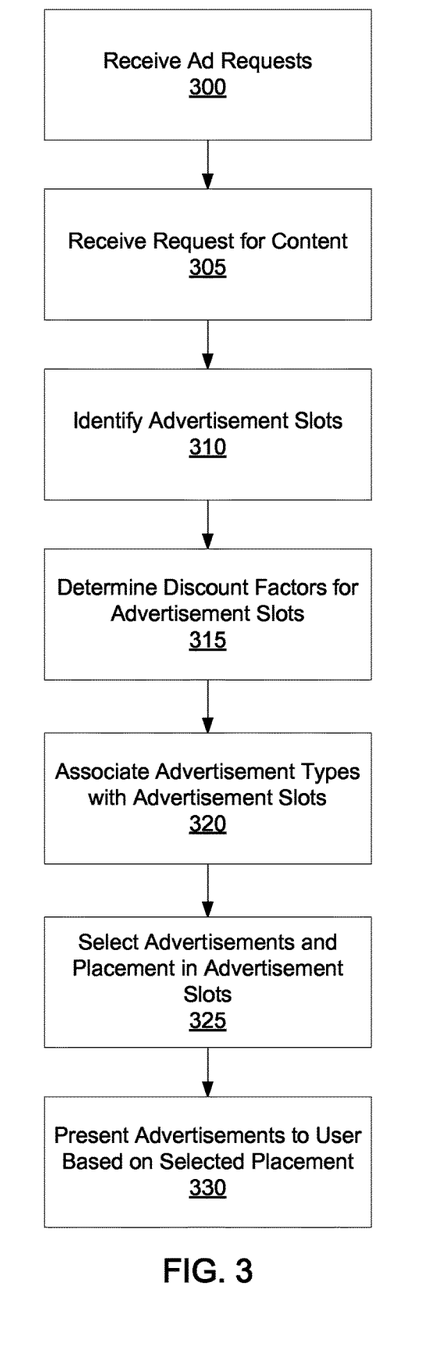
FIG. 3 is a flowchart of a method for determining placement of advertisements in advertisement slots for presentation to an online system user, in accordance with an embodiment.

FIG. 3 is a flow chart of one embodiment of a method for determining placement of advertisements in advertisement slots for presentation to a user of the online system. The online system 140 receives 300 information about advertisements, such as in advertisement requests. For example, received information about an advertisement includes the advertisement, a bid amount associated with the advertisement, a type associated with the advertisement, targeting criteria associated with the advertisement, display times associated with the advertisement, etc. Received information about an advertisement may be stored in the ad request store 230. After receiving 300 information describing one or more advertisements, the online system 140 receives 305 a request for content from an online system user. In one embodiment, when the request for content is received 305, the online system 140 identifies and selects candidate advertisements from the ad request store 230 for presentation to the user based on information associated with the user and targeting criteria associated with ad requests.

Within one or more regions of the requested content, the online system 140 identifies 310 advertising slots, which indicate locations in a page layout where one or more advertisements are presented to the user. For example, advertising slots are arranged vertically or horizontally in different portions of a page layout including content presented by the online system 140, and some or all of the page layout is being presented to the user. In one embodiment, locations in a page layout for presentation of advertisements are segmented into a number of advertising slots that depends on the dimensions of the advertisements selected for presentation in various locations.

In some embodiments, discount factors for presenting advertisements in each of the advertisement slots are determined 315 based on a position of an advertisement slot, a type associated with the candidate advertisements, types associated with other advertisements to be presented in additional advertisement slots, or some combination thereof. Additionally, in some embodiments, an advertisement size or a size of a slot in which an advertisement is presented is used when determining 315 the discount factors. Characteristics of an advertisement may affect the discount factor determined 315 for presenting the advertisement in an advertisement slot. Example characteristics of an advertisement affecting the discount factor for presenting an advertisement in an advertisement slot include the size of a variable dimension of the advertisement, the type of content included in the advertisement, etc. Presentation of other advertisements of the same type in other advertisement slots may affect a discount factor for presenting an advertisement in an advertisement slot. In some embodiments, a discount factor for presenting an advertisement in an advertisement slot is based in part on the types of advertisements presented in advertisement slots adjacent to an advertisement slot.

Based on the discount factors for presenting candidate advertisements in various advertisements slots and bid amounts associated with candidate advertisements, types of advertisements are associated 320 with advertisement slots. For example, values associated with presenting various candidate advertisements in various advertisement slots are determined from the discount factors for presenting candidate advertisements in different advertisement slots and bid amounts associated with the candidate advertisements. In some embodiments, a discount factor is applied to a bid associated with a particular position. For example, if an advertiser bids 1 dollar per click for a first advertisement slot 1, and the click through rate of a second advertisement slot is half that of the first advertisement slot, the discount factor is one half. A value for presenting an advertisement type with an advertisement slot may be based on prior interactions between users and advertisements of the same type. Alternatively, values are determined for presenting an advertisement type in an advertisement slot based on bid amounts associated with advertisements having the advertisement slot and discount factors for presenting the advertisements in the advertisement. Based on the values for presenting different candidate advertisements in different advertisement slots, an advertisement type is associated with each advertisement slot. For example, an advertisement type associated with a candidate advertisement having a highest value for presentation each advertisement slot is associated with each advertisement slot. Various associations between advertisement type and advertisement slot may be determined, and an association between advertisement types and advertisements slots having the maximum value is selected.

Association of advertisement types with advertisement slots may be subject to constraints on placement of types of advertisements relative to each other specified by one or more ad placement rules retrieved from the placement rule store 240. Application of one or more ad placement rules allows different advertisement slots to present different types of advertisements. As described above in conjunction with FIG. 2, ad placement rules may limit the number of a type of advertisement presented at one time or may identify positioning of various advertisement types relative to each other. Ad placement rules may also prevent a user from being presented with multiple advertisements of the same type in consecutive advertisement slots to increase user interaction with other types of presented advertisements.

Based on associations between types of advertisements and advertisement slots, bid amounts associated with advertisements, and discount factors associated with presenting advertisements in various advertisement slots, advertisements and a placement of advertisements in advertisement slots are selected 325. Selection of an advertisement for presentation in an advertisement slot is based on values for presenting various advertisements having a type associated with the advertisement slot in the advertisement slot. Discount factors associated with presenting an advertisement in an advertisement slot and a bid amount associated with the advertisement are used to determine the values for presenting the advertisement in the advertisement slot.

Total values for placement of different advertisements having an advertisement type associated with an advertisement slot in each advertisement slot may be determined, and a placement of advertisements in advertisement slots selected 325 based on the total values. For example, a placement of advertisements in advertisement slots having a maximum total value is selected 325, maximizing the value to the online system 140 of presenting the advertisements. In some embodiments, for an advertisement slot associated with a type of advertisement, a value for presenting each advertisement of the type associated with the advertisement slot is determined from the advertisements' bid amounts and the discount factor for presenting each advertisement in the advertisement slot. For example, the online system 140 executes a recursive algorithm that attempts to fill each advertisement slot with each advertisement type to determine an advertisement type that has a maximum value for each advertisement slot. As described above in conjunction with FIG. 2, the discount factors may account for different sizes of advertisements, different content included in an advertisement, and other types of advertisements associated with additional advertisement slots (e.g., advertisement slots associated with the same type, types of advertisements associated with adjacent advertisement slots). Based on values for presenting different advertisements having a type associated with an advertisement slot in each advertisement slot, a total value is determined, and advertisements are selected for presentation in different advertisement slots to maximize the total value. The online system 140 presents 330 the selected advertisements to a user based on the selected placement.

SUMMARY

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments are intended to be illustrative, but not limiting, of the scope of the embodiments, which is set forth in the following claims.

What is claimed is:

1. A method comprising:
    responsive to a request to present content through a user interface to a viewing user of an online system, identifying a plurality of advertisement slots of the content to be presented through the user interface, the plurality of advertisement slots vertically arranged on a page layout of the user interface in a stack;
    retrieving, from an advertisement request store of the online system, a plurality of candidate advertisements;
    classifying, by a processor of the online system, each of the plurality of candidate advertisements as a type of advertisements, the classifying based on a vertical dimension of the candidate advertisement and a type of content included in the candidate advertisement;
    retrieving, from an action log of the online system and for each of the types of advertisements associated with one of the plurality of candidate advertisements, a set of historical user interactions of users of the online system with a set of previously presented advertisements that belong to the type of advertisements;
    determining, by the processor of the online system, an expected value of expected interactions for each type of advertisements based on a number of the historical user interactions stored in the action log that are associated with the type of advertisements;
    retrieving a plurality of rules that specify constraints in selecting the type of advertisements for the advertisement slots, the plurality of rules comprising a first rule that limits a maximum number of advertisement belonging to a particular type to be included in the page layout and a second rule that prohibits two adjacent advertisement slots having the same type of advertisements;
    selecting, for each of the plurality of advertisement slots and subject to the constraints specified in the plurality of rules, one of the types of advertisement to fill the advertisement slot, the selecting based on increasing an overall expected value of expected interactions of the page layout, the overall expected value being an aggregate amount of the expected value for each type of advertisement selected for the advertisement slot;
    determining a discount factor of each advertisement slot based on a position of the advertisement slot and the type of advertisements, the discount factor of each advertisement slot increased with the position of the advertisement slot and with a number of same type of advertisements presented in other slots;
    for each advertisement slot from the plurality of advertisement slots, selecting, by the online system, an advertisement from the plurality of candidate advertisements, the selected advertisement belonging to the type of advertisements selected for the advertisement slot; and
    sending, by the online system, the user interface comprising the selected advertisements placed in the plurality of advertisement slots for display to the viewing user.

2. The method of claim 1, wherein the type of advertisements is classified further based on priorities associated with the advertisements.

3. The method of claim 1, wherein selecting one of the types of advertisement to fill each of the plurality of advertisement slots comprises:
    using a bipartite graph match algorithm including the constraints specified in the plurality of rules to fill the advertisement slot until each of the plurality of advertisement slots is associated with a particular type of advertisements, the bipartite graph match algorithm matching the advertisement slots and the types of advertisement to increase the overall expected value of expected interactions of the page layout.

4. The method of claim 3, wherein the bipartite graph match algorithm fills the advertisement slot by taking the discount factor of each advertisement slot into account.

5. The method of claim 1, wherein the advertisement selected from the plurality of candidate advertisements for each advertisement slots selected based on a bid amount of the advertisement.

6. The method of claim 1, wherein the discount factors are further based on historical user interactions with the plurality of advertisement slots.

7. A method comprising:
    responsive to a request to present content through a user interface to a viewing user of an online system, identifying a plurality of advertisement slots of the content to be presented through the user interface, the plurality of advertisement slots vertically arranged on a page layout of the user interface in a stack;
    selecting a plurality of candidate advertisements eligible for presentation to the viewing user;
    classifying, by a processor of the online system, each of the plurality of candidate advertisements as a type of advertisements, the classifying based on a type of content included in the candidate advertisement;
    retrieving, from an action log of the online system and for each of the types of advertisements associated with one of the plurality of candidate advertisements, a set of historical user interactions of users of the online system with a set of previously presented advertisements that belong to the type of advertisements;
    determining, by the processor of the online system, an expected value of expected interactions for each type of advertisements based on a number of the historical user interactions stored in the action log that are associated with the type of advertisements;

retrieving a plurality of rules that specify constraints in selecting the type of advertisements for the advertisement slots, the plurality of rules comprising a rule that prohibits two adjacent advertisement slots having the same type of advertisements;

selecting, for each of the plurality of advertisement slots and subject to the constraints specified in the plurality of rules, one of the types of advertisement to fill the advertisement slot, the selecting based on increasing an overall expected value of expected interactions of the page layout, the overall expected value being an aggregate amount of the expected value for each type of advertisement selected for the advertisement slot;

determining a discount factor of each advertisement slot based on a position of the advertisement slot and the type of advertisements, the discount factor of each advertisement slot increased with the position of the advertisement slot and with a number of same type of advertisements presented in other slots;

for each advertisement slot from the plurality of advertisement slots, selecting, by the online system, an advertisement from the plurality of candidate advertisements, the selected advertisement belonging to the type of advertisements selected for the advertisement slot; and sending, by the online system, the user interface comprising the selected advertisements placed in the plurality of advertisement slots for display to the viewing user.

8. The method of claim 7, wherein the type of advertisements is classified further based on sizes of the advertisements and priorities associated with the advertisements.

9. The method of claim 7, wherein selecting one of the types of advertisement to fill each of the plurality of advertisement slots comprises:

bipartite graph match algorithm including the constraints specified in the plurality of rules to fill the advertisement slot until each of the plurality of advertisement slots is associated with a particular type of advertisements, the bipartite graph match algorithm matching the advertisement slots and the types of advertisement to increase the overall expected value of expected interactions of the page layout.

10. The method of claim 9, wherein the bipartite graph match algorithm fills the advertisement slot by taking the discount factor of each advertisement.

11. The method of claim 7, wherein the discount factors are further based on historical user interactions with the plurality of advertisement slots.

12. The method of claim 7, wherein the advertisement selected from the plurality of candidate advertisements for each advertisement slot is selected based on a bid amount of the advertisement.

13. A method comprising:

responsive to a request to present content through a user interface to a viewing user of an online system, identifying a plurality of advertisement slots of the content to be presented through the user interface, the plurality of advertisement slots vertically arranged on a page layout of the user interface in a stack;

selecting a plurality of candidate advertisements eligible for presentation to the viewing user;

classifying, by a processor of the online system, each of the plurality of candidate advertisements as a type of advertisements, the classifying based on a type of content included in the candidate advertisement;

retrieving, from an action log of the online system and for each of the types of advertisements associated with one of the plurality of candidate advertisements, a set of historical user interactions of users of the online system with a set of previously presented advertisements that belong to the type of advertisements;

determining, by the processor of the online system, an expected value of expected interactions for each type of advertisements based on a number of the historical user interactions stored in the action log that are associated with the type of advertisements;

retrieving a plurality of placement rules that specify constraints in selecting the type of advertisements for the advertisement slots;

selecting, for each of the plurality of advertisement slots and by a bipartite graph match algorithm including the constraints specified in the plurality of placement rules, one of the types of advertisement to fill the advertisement slot until each of the plurality of advertisement slots is associated with a particular type of advertisements, the bipartite graph match algorithm matching the advertisement slots and the types of advertisement to increase an overall expected value of expected interactions of the page layout, the overall expected value being an aggregate amount of the expected value for each type of advertisement selected for the advertisement slot;

determining a discount factor of each advertisement slot based on a position of the advertisement slot and the type of advertisements, the discount factor of each advertisement slot increased with the position of the advertisement slot;

for each advertisement slot from the plurality of advertisement slots, selecting, by the online system, an advertisement from the plurality of candidate advertisements, the selected advertisement belonging to the type of advertisements selected for the advertisement slot; and sending, by the online system, the user interface comprising the selected advertisements placed in the plurality of advertisement slots for display to the viewing user.

14. The method of claim 13, wherein the type of advertisements is classified further based on sizes of the advertisements and priorities associated with the advertisements.

15. The method of claim 13, wherein one of the plurality of placement rules specifies a maximum number of advertisement slots associated with a specified type of advertisement.

16. The method of claim 13, wherein one of the plurality of placement rules specifies a maximum number of adjacent advertisement slots associated with a specified type of advertisement.

17. The method of claim 13, the advertisement selected from the plurality of candidate advertisements for each advertisement slot is selected based on a bid amount of the advertisement.

18. The method of claim 13, wherein the plurality of placement rules further comprises a rule that limits a maximum number of advertisement belonging to a particular type to be included in the page layout.

19. The method of claim 13, wherein the plurality of placement rules further comprises a rule that prohibits two adjacent advertisement slots having the same type of advertisements.

20. The method of claim 13, wherein the discount factor of each advertisement slot also increases with a number of same type of advertisements presented in other slots.

* * * * *